United States Patent Office 3,476,733
Patented Nov. 4, 1969

3,476,733
PROCESS FOR THE PREPARATION OF HIGH MOLECULAR WEIGHT POLYMERS OF CONJUGATED DIENES
Cornelis E. P. V. Van Den Berg, Geleen, Netherlands, assignor to Stamicarbon N.V., Heerlen, Netherlands
No Drawing. Filed July 6, 1966, Ser. No. 563,069
Claims priority, application Netherlands, July 9,1965, 6508841
Int. Cl. C08f 29/08, 1/64
U.S. Cl. 260—94.3
24 Claims

ABSTRACT OF THE DISCLOSURE

A process is described for preparing sulfur-vulcanizable butadiene polymers in the present of a catalyst produced from a metal carbonyl compound where the metal is selected from nickel and cobalt, together with a metal halide, by releasing the carbon monoxide from the carbonyl compound in the presence of a compound which is an aliphatic or cycloaliphatic compound with at least one olefinically unsaturated group, or a compound with at least one alkynically unsaturated group.

---

The present invention relates to a process for the preparations of high molecular weight polymers of conjugated dienes in the presence of a catalyst produced from a nickel and/or cobalt carbonyl compound and a metal halide.

In the German patent specification No. 1,051,003 it is stated that numerous olefinic compounds, such as mono-olefines, diolefines, e.g. butadiene and isoprene, and many other compounds, for instance styrene, vinyl chloride, vinylidene chloride, vinyl ethers, vinyl esters, acrylonitrile, tetrafluoroethylene and trifluorochloroethylene, can be polymerized by means of catalysts consisting of a metal carbonyl and an inorganic or organic halogen compound. In the examples only the polymerization of the mono-olefinic compounds ethylene, methyl acrylate, vinyl acetate, and styrene is described, and the only catalysts used in these processes are nickel carbonyl and an organic halogen compound, viz. carbon tetrachloride or chlorobenzene.

Furthermore, the German patent specification No. 1,026,959 states that the catalyst used in the polymerization of the previously mentioned olefinic compounds may be a substitution or addition product of a metal carbonyl, which may, if so desired, be applied in combination with a halogen compound. Also in the examples given in this latter specification only ethylene, methyl acrylate, vinyl acetate and styrene are polymerized, the catalyst consisting only of a mixture of a nickel-carbonyl-triphenyl-phosphine substitution product and carbon tetrachloride.

The later German patent specification No. 1,156,986, which was filed in the same name as the two patent specifications mentioned before, states that when the catalysts named in these patent specifications are used in the polymerization of 1.3-dienes, the products obtained are deficient as regards gel content, stereospecificity, and narrowness of molecular weight distribution. Because of this, the said German patent specification No. 1,156,986 proposes to use in the polymerization of 1,3-dienes a catalyst consisting of a mixture of a cobalt or nickel carbonyl compound (including a substitution or addition compound thereof), an aluminum halide, and an aluminum-organic compound and/or a complex-forming substance for the aluminum halide. However, a drawback of this process is that the aluminum-organic compounds and the complex-forming substances for the aluminum halide that are used in it are expensive, and that the former compounds constitute a serious fire hazard. Further drawbacks are that among the aluminum halides used, aluminum chloride is a solid compound that is difficult to supply, and aluminum bromide is expensive.

The Japanese patent specification No. 1,687/62 proposes to polymerize diolefines or alpha-olefines with the aid of catalysts consisting of a complex compound of a metal of the eighth group of the Periodic System and a Lewis acid, for instance boron trifluoride-etherate, aluminum chloride, titanium tetrachloride, antimony tetrachloride, and zinc chloride. An example describes a process in which nickel carbonyl is fed into an autoclave together with titanium tetrachloride and benzene, and the mixture is stirred for ½ hr. at room temperature. Liquid butadiene is added to the catalyst thus prepared in the autoclave, after which the autoclave is hermetically closed. After a reaction period of 41 hrs. a reaction product is obtained which consists of 42% by weight of a gel, the cis-content of the remaining portion being only about 47%.

It is also known that if use is made of nickel carbonyl and a Friedel-Crafts catalyst, by preference aluminum chloride or mercuric chloride, in the polymerisation of butadiene the stereospecificity of the polybutadiene thereby obtained can be controlled by the choice of the distributing agent (see the French patent specification No. 1,377,676, e.g. the Summary, under B 7e and 8e). If a non-polar distributing agent is used, the resulting product will have a cis-content of at most about 65%; if the distributing agent is at least 10% polar, about 95% of the product will have the transstructure.

The last two mentioned processes for the polymerisation of butadiene are effected in an autoclave, because the butadiene has a low boiling point, and because the nickel carbonyl is highly volatile and—even in low concentrations—extremely toxic. In all examples of these processes the catalyst components are introduced to the autoclave first, followed by the liquid butadiene. Thereafter the autoclave is hermetically closed and left in this condition until the polymerization has been completed, as a result of this procedure any carbon monoxide that might be formed during the polymerization cannot escape.

Surprisingly, it has now been found that a very good catalyst for the polymerization of conjugated dienes to high-molecular-weight polymers is obtained by releasing carbon monoxide from the corbonyl compound, with the aid of certain metal halides and in the presence of certain unsaturated compounds and wholly or partly removing the carbon monoxide formed. By high-molecular-weight polymers is herein understood the polymers having a degree of polymerization of 50 or higher.

It is an object of the present invention to provide a process which renders it possible to prepare high-molecular-weight polymers of conjugated dienes, and in particular high-molecular-weight polybutadiene with a very high cis-content, for instance over 80%, and in most cases more than 90%. In addition to the high stereospecificity, the catalyst used has a very high activity; moreover it is comparatively cheap and, in most cases, does not cause a fire hazard. Further advantages of the invention will be mentioned hereinafter.

The process according to the invention for the preparation of high molecular weight polymers of conjugated dienes in the presence of a catalyst produced from a nickel and/or cobalt carbonyl or partly substituted carbonyl compounds and a metal halide, is characterized in that (a) the metal halide used in a halide of a metal of the 4th–6th groups of Mendeléeff's Periodic System and in that (b) it is seen to that carbon monoxide is released from the carbonyl compound in the presence of one or more aliphatic and/or cyclo-aliphatic compounds with one or more olefinically-unsaturated groups and/or one or more compounds with one or more alkynically unsaturated groups, and that at least a portion of the carbon monoxide is removed from the reacting system.

The release of carbon monoxide from the carbonyl compound may take place in the presence of one or more aliphatic and/or cyclo-aliphatic compounds with one or more olefinically-unsaturated groups. Such compounds may, if so desired, contain groups with aromatic ring systems. Suitable compounds include mono-olefines such as ethylene, propylene, butylene, isobutylene, pentene, 2-methyl butylene-1, 3-methyl butylene-1, hexene, 3.3-dimethyl butylene-1, heptene, octene, dodecene, vinyl cyclohexane, cyclobutylene, cyclopentene and cyclohexene and diolefines such as propadiene, pentadiene 1-4, hexadiene 1-4, hexadiene 1-5, cyclohexadiene 1-4, cycloheptadiene 1-4 and cyclooctadiene 1-4. The release of carbon monoxide preferably takes place in the presence of one or more conjugated dienes that can be polymerized with the resulting catalyst, for instance butadiene or isoprene. It may be of advantage if the conjugated diene used is the same as that to be polymerized by means of the catalyst produced. In this latter procedure no foreign components are introduced into the polymerization medium. Suitable alkylnically-unsaturated compounds are, for instance, acetylene, phenyl acetylene, and diphenyl acetylene. Only very small amounts of the unsaturated compound need be present; for instance a molar ratio of unitary with respect to the carbonyl compound may be used. However, it is recommendable to employ a larger amount of unsaturated compound(s), e.g. 4 moles or more, per mole of carbonyl compound. In addition to the unsaturated compound(s), inert distributing agents may be present, for instance those which can be used in the polymerization.

It is not necesary to remove all the carbon monoxide from the carbonyl compound. One or more of the carbon monoxide molecules in, for instance, nickel tetracarbonyl or dicolbalt octacarbonyl may without objection remain in the molecule. If one or more carbon monoxide molecules have already been replaced by other molecules, as is the case e.g. in the complex compound triphenyl phosphine-nickel carbonyl ($Ni(CO)_2(P(C_6H_5)_3)_2$, at least one carbon monoxide molecule will have to be removed from the carbonyl compound used. If carbon monoxide is removed from the carbonyl compound, this will here be called the "conditioning" of the carbonyl compound; the resulting compound will here be called the "conditioned" carbonyl compound.

The removal of the carbon monoxide is effected in such a way as to prevent the carbon monoxide from recombining with the nickel and/or colbalt. A simple method of removal is by continuous or discontinuous flushing with an inert gas or an inert vapour, e.g. nitrogen, hydrogen or a hydrocarbon such as methane, of the space in which the carbon monoxide is formed. If the release of the carbon monoxide takes place in the presence of an easily evaporated, liquid conjugated diene, it may be advantageous to evaporate part of the diene. After the carbon monoxide has been removed from the gaseous diene the gaseous diene can be used again, for instance by again feeding it, in the gaseous or liquid state, into the space where the carbon monoxide is formed, or by feeding it into the polymerization space.

Another way of removing the carbon monoxide formed is by absorbing it using a surface-active adsorbent. To ensure effective adsorption it should of course be seen to that other compounds, for instance the carbonyl compound or the conjugated diene used, are not adsorbed to such a degree that little or no carbon monoxide can be adsorbed. The carbon monoxide may also be removed by chemical adsorption by a suitable adsorbent.

It is not necessary to remove all of the carbon monoxide that has been formed. It need hardly be said that, if a high polymerization rate is desired, the catalyst will be made as active as possible, and hence the concentration of the carbon monoxide formed will be kept as low as possible.

During the release and the removal of the carbon monoxide, other compounds may also be present, in particular the metal halide which together with the conditioned carbonyl compound constitutes the catalyst for the polymerization of conjugated dienes. The very active and stereospecific catalyst formed in this way can be supplied, without further processing, to the polymerization space, which may be enclosed, if so desired. In that case, the preparation of the catalyst and the polymerization take place in separate stages. Preferably, the formation and the removal of the carbon monoxide are made to take place during polymerization, so that the conditioning of the carbonyl compound and the polymerization are effected in a single stage. In this case, the unsaturated compound in the presence of which carbon monoxide is released is, in general, the conjugated diene that is polymerized with the resulting catalyst. The carbon monoxide formed may expeditiously be removed for instance by using an auxiliary gas, such as nitrogen.

The conjugated dienes that can be polymerized in accordance with the invention are usually aliphatic or cycloaliphatic compounds with conjugated double C—C bonds that may be incorporated wholly or partly in a cyclo-aliphatic ring. Suitable conjugated dienes are for instance butadiene, isoprene, 2.3-dimethyl butadiene 1-3, pentadiene 1-3, 2-methyl pentadiene 1-3, 4-methyl pentadiene 1-3, hexadiene 1-3, hexadiene 2-4, octadiene 2-4, decadiene 1-3, decadiene 3-5, undecadiene 1-3, dimethyl fulvene, vinyl cyclohexene-1, cyclopentadiene 1-3, cyclohexadiene 1-3, cyclo-octadiene 1-3, such compounds as heptatriene 1-3-6, 3-methyl heptatriene 1-4-6, octatriene 1-3-7, cyclo-octatriene 1-3-6, cyclo-octatriene 1-3-7, and, if so desired, halogen-containing dienes, for instance chloroprene. Preferably, use is made of aliphatic compounds possessing 4–12 carbon atoms, e.g., butadiene and isoprene. It is also possible to use mixtures of conjugated dienes, if so desired mixed with saturated or unsaturated hydrocarbons.

Suitable carbonyl compounds are, for instance, nickel carbonyl phosphorus trifluoride, nickel carbonyl triphenyl phosphine, dicobalt octacarbonyl, tetracobalt dodecacarbonyl, cobalt carbonyl hydrogen, nitrosyl cobalt carbonyl ($Co(CO)_3NO$) and diphenyl acetylene dicobalt hexacarbonyl. Mixtures of carbonyl compounds may be used. Preferably, nickel tetracarbonyl is utilized, because it is the cheapest carbonyl compound and yields a very active catalyst.

The halide of a metal of the 4th–6th groups of Mendeléeff's Periodic System include titanium halides, for instance titanium tetrabromide, titanium tetraiodide and titanium trichloride, zirconium tetrachloride, tin tetrachloride, vanadium pentachloride, vanadium oxychloride, antimony tetrachloride, chromium oxychloride, and tungsten hexachloride. A compound of which one or more—but not all—halogen atoms have been replaced by a hydrogen atom or an OR group (R being a hydrogen atom, or an alkyl, cyclo-alkyl or aryl group, which may contain from 1 to 12 carbon atoms) can also be employed for instance a titanium alkoxy halide or a titanium hydroxy halide. Preferably, use is made of titanium tetrachloride. Since not all halides have an equally strong influence on the catalyst, mixtures of metal halides may be used for controlling the properties of the catalyst such as a mixture of titanium tetrachloride and titanium trichloride.

The ratio between the carbonyl compound and the metal halide may be varied within wide limits. In general, the molar ratio of the carbonyl compound to the metal halide is between 35:1 and 1:35. Higher or lower ratios can also be employed, but this does not present special advantages. Usually, the ratio between the catalyst components will be more nearly equimolecular, for instance between 10:1 and 1:10 to decrease the catalyst cost, and also because the stereospecificity of the catalyst shows little or no decrease with respect to ratios outside the latter range. Preferably, a ratio between 5:1 and 1:5 is used.

The concentration of the catalyst may be varied within wide limits. The concentration of the catalyst should here be understood as the sum of the concentrations of the metal-containing catalyst components. A particular advantage of the catalyst according to the invention is its extraordinarily high activity. Up to about 300 grams, or more, of high-molecular-weight polybutadiene with 96% cis 1–4 units can be obtained per mmole of nickel carbonyl. In general the concentration may be between 100 and 0.002 mmole per litre of reaction medium. If the carbonyl compound is conditioned during the polymerization, so that the catalyst is formed in the polymerization medium, low catalyst concentrations are usually used, for instance concentrations lower than 25 mmoles per litre of polymerization medium. In most cases concentrations between 10 and 0.05 mmole per litre of polymerization medium are used. It is also possible to apply concentrations smaller than 0.05 mmole per litre, but in this case the impurities from the starting materials must not deactivate the catalyst. If the carbonyl compound is conditioned outside the polymerization space, higher concentrations of carbonyl compound can be applied. A concentrated catalyst may then be formed, which can be added to the polymerization medium continuously or discontinuously.

It has been found that by adding an activator to the catalyst or to one or more catalyst components the activity of the catalyst can be further raised. The activator may be a compound containing a free electron pair, for instance a compound of an element of the 5th or the 6th main group of the Periodic System, in particular nitrogen, phosphorus, oxygen, and sulphur. The addition may consist, for instance, of ammonia; amines such as trimethyl amine, triethyl amine, or amines having various alkyl, cycloalkyl, or aryl groups and with or without hydrogen bound to the nitrogen atom, for instance N-phenyl-β-naphthyl amine; nitrogen oxides, for instance nitrogen monoxide; nitriles for instance acrylonitrile; carboxylic acids, for instance formic acid, acetic acid, and stearic acid; alcohols, for instance methanol and butanol; ethers, for instance diethyl ether and dibutyl ether; aldehydes, for instance acrolein. Preferably water or an oxygen-containing gas is used, as these are very cheap and very easy to use and to control. The amount of activator that can be added depends on the catalyst system applied and on the nature of the activator itself. In general, amounts between 10 and 300 moles percent with respect to the amount of catalyst will suffice.

The polymerization according to the invention may be carried out at temperatures between −50° C. and +150° C. preferably between −20° C. and +70° C. It is advantageous to use room temperature or slightly higher or lower temperatures.

The pressure is not critical. The process can be carried out at about atmospheric pressure, or at higher pressures, for instance 1, 2, 4, 10, 20 atm., or more. If the process is carried out at high pressure in an enclosed space, for instance an autoclave, from which no carbon monoxide can be discharged, the catalyst should be prepared in advance, or at least the carbonyl compound conditioned in advance. However, since in this case higher operational pressures can be applied, it is possible to reach a higher polymerization rate. In each particular case the cost involved in the use of higher pressures is to be weighed against the saving in catalyst cost. The polymerization can also be carried out at lower pressures, for instance ¾, ½, ¼ or ¹⁄₁₀ atm. In this case, as in the process carried out at about atmospheric pressure, the catalyst can easily be conditioned during the polymerization, although this is not necessary.

The molecular weight of the polymers prepared may be measured by the method of Mooney (ASTM D927), and is in general dependent on the ratio between the catalyst components, the plurity of the conjugated diene and the activator added. A higher ratio of carbonyl compound to halide in general results in a lower Mooney viscosity. Addition of substances controlling the molecular weight, for instance hydrogen, is possible. The molecular weight can also be controlled by means of the polymerization temperature or by means of the catalyst concentration.

The polymerization can be effected in an inert solvent, i.e. a solvent not containing components that, in the amount in which they are used, completely or substantially inhibits the catalytic activity. It is, for instance, possible to have a small amount of an alcohol present during the polymerization and to use this as an activator for the catalyst. If larger amounts are employed, however, the catalyst becomes inactivated. This effect may be used for stopping the reaction. The distributing agent may, in general, be a liquid or liquefied saturated aliphatic or cycloaliphatic hydrocarbon, for instance ethane, propane, butane, pentane, hexane and heptane or other petroleum fractions, cyclohexane free of aromatics, isopropyl cyclohexane, aromatic hydrocarbons, for instance benzene, toluene and xylene, or halogen-containing aliphatic, cycloaliphatic, or aromatic hydrocarbons, for instance carbon tetrachloride, tetrachloroethylene, methylchloride, tert. butyl chloride, and chlorobenzene. Mixtures of the compounds described above may be used. Preferably, use is made of heptane or a gasoline fraction consisting largely of heptane, or benzene or toluene. In addition to or instead of the distributing agents described above, one or more of the conjugated dienes that are to be polymerized, in particular butadiene, or other saturated hydrocarbons, may be used in the liquid state as solvent.

To the polymer prepared according to the invention, conventional additives may be incorporated. In particular with respect to polybutadiene there may be added such chemicals as zinc oxide, stearic acid, antioxidants, UV-stabilizers, organic vulcanisation accelerators, e.g. tetramethyl thiuram disulphide, 2-mercaptobenzothiazole, so-called "tackifiers," dyestuffs and pigments. If so desired, at least some of these additives, e.g. one or more antioxidants, may be already present during the polymerization step or the conditioning of the carbonyl compound. The chemicals may be added as such, but preferably they are incorporated in the distributing agent used and/or in one or more of the conjugated dienes. It is also possible to add during the polymerization fillers such as chalk and kaolin, reinforcing fillers, e.g. "HAF," "ISAF," "FEF," and "SRF" (so-called "furnace blacks"), and so-called "extender oils."

Rubbery polymers obtained by the process according to the invention, in particular polybutadiene with a very high cis-content of, for instance, over 80%, and generally over 90%, can be vulcanized in a simple way by heating them in the presence of sulphur at 100–250° C., preferably at 140–170° C. Also sources of free radicals, for instance peroxides, may be added. The said polymers can be mixed in a simple way with other rubbers, for instance natural rubber or styrene-butadiene rubber, and upon vulcanization yield a product which has excellent properties and can be processed in particular into motorcar tires. A very special advantage of the resulting high-molecular-weight butadiene polymers is that they can readily be processed on a roller without being previously mixed with another rubber, which is in sharp contrast to the butadiene polymers of comparable viscosity known so far, which can not at all, or hardy, be treated on a roller. The polybutadiene obtained according to the invention forms a plastic and cohesive mass on the roller. The necessary rubber additives can be mixed with the polybutadiene without difficulty, and the product thus obtained can be processed to motor car tires in a simple way. The rubbery polymers obtained by the process according to the invention can also be used in the manufacture of cycle tires, conveyor belting, shoes and floor covering materials.

The polymers obtained by the process according to the invention can be formed into crumbs, sheets, strands or bales.

The following examples are intended to elucidate the invention, without, restricting it. The term "cis-content" as used here denotes the number of bonds possessing a cis-structure per one hundred double carbon-carbon bonds.

EXAMPLE 1

A 1000-ml. flask, equipped with a stirrer, a thermometer, a gas feed line, and a gas discharge line with a cooling jacket, contained 500 ml. of dry heptane (boiling point 94–98° C.) saturated with butadiene. With exclusion of moisture and air, 1 mmole of nickel carbonyl and 1 mmole of titanium tetrachloride were added to the heptane, after which gaseous butadiene was supplied so that part of it issued from the flask. After about 20 min. the temperature of the polymerization medium began to rise to about 50° C., as a result of the heat of polymerization. After a polymerization time of 60 min., during which period the escaping butadiene had a carbon monoxide content of 0.3% by volume, the polymerization medium was viscous, and the polymerization was stopped by the addition of 5 ml. of methanol, whereupon the catalyst residue was removed by stirring the polymerization medium with 100 ml. of distilled water. After the aqueous layer had been separated off, the polymer was stabilized with a commonly used antioxidant. After that the polymer was coagulated by pouring the polymer solution into 300 ml. of a mixture consisting of equal parts by volume of methanol and acetone. Thereafter the polymer was dried in vacuo at room temperature, and next homogenized on a rolling mill and again stabilized. The yield consisted of 30 g. of virtually gel-free polymer having a cis-content of 93% and a Mooney viscosity of 30.

EXAMPLE 2

The process according to Example 1 was repeated, except that the escape from the flask of gaseous butadiene was prevented, so that no carbon monoxide could issue. The polymerization had not started after two hours, but when the gas discharge was then opened and the carbon monoxide could escape, the color of the distributing agent changed from light yellow to brownish grey, and polymerization set in. The polymerization was stopped by supplying butadiene containing carbon monoxide. Analysis of the gas mixture over the polymerization medium showed this mixture contained 1.7% by volume of carbon monoxide.

EXAMPLES 5–7

Example 1 was repeated, with the difference, however, that the catalyst compositions and polymerization times were as shown in the table below, and that the polymerization medium was heptane, used in an amount of 350 ml. The resulting polybutadiene had the properties shown in the table.

| Ex. | Catalyst composition | Polymerization time, min. | Polybutadiene Yield (g.) | Composition 1-4 cis | 1-4 trans | 1.2 |
|---|---|---|---|---|---|---|
| 5 | 10 mmoles nickel tetracarbonyl, 11 mmoles tungsten hexachloride. | 330 | 7 | 90 | 7 | 3 |
| 6 | 5 mmoles nickel tetracarbonyl, 5 mmoles tin tetrachloride. | 300 | 7 | 89 | 8 | 3 |
| 7 | 5 mmoles nickel tetracarbonyl, 5 mmoles antimony trichloride. | 360 | 7 | 84 | 14 | 1 |

EXAMPLES 8–12

Under similar conditions as stated in Example 1, but with the use of the amounts of catalyst components and the polymerization times shown in the table, polymers were prepared which had the properties shown

| Ex. | Catalyst components | Polymerization time, min. | Amount of polymer (g.) | Cis-cont. (percent) | Mooney viscosity |
|---|---|---|---|---|---|
| 8 | 1 mmole nickel tetracarbonyl, 2 mmoles titanium tetrachloride. | 90 | 25 | 93 | 53 |
| 9 | ½ mmole nickel tetracarbonyl, 2 mmoles titanium tetrachloride. | 120 | 19 | 92 | 57 |
| 10 | 4 mmoles nickel tetracarbonyl, 2 mmoles titanium tetrachloride. | 100 | 39 | 91 | 40 |
| 11 | 25 mmoles nickel tetracarbonyl, 1 mmole titanium tetrachloride. | 60 | 29 | 93 | 23 |
| 12 | ¼ mmole nickel tetracarbonyl, ½ mmole titanium tetrachloride. | 60 | 24 | 93 | 48 |

EXAMPLES 13–17

Example 1 was repeated, with the use, however, of the distributing agents and polymerization times shown in the table below. The catalyst was a mixture of nickel tetracarbonyl and titanium tetrachloride, used in the amounts shown in the table.

| Example | Amounts of nickel tetracarbonyl and titanium tetrachloride, resp., mmoles | Distributing agent | Polymerization time, min. | Polymer yield, g. | Cis-content, percent | Mooney viscosity |
|---|---|---|---|---|---|---|
| 13 | ¼; ½ | Heptane free of aromatics | 60 | 28 | 94 | 43 |
| 14 | ¼; ½ | Benzene | 60 | 44 | 93 | 17 |
| 15 | ¼; ½ | Carbon tetrachloride | 60 | 28 | 94 | 34 |
| 16 | 2½; 2½ | Tetrachloroethylene | 150 | 28 | 92 | 33 |
| 17 | 2½; 5 | Tert. butylchloride | 300 | 38 | 91 | 15 |

EXAMPLE 3

The process of Example 1 was repeated, with the difference that titanium tetrabromide or titanium tetraiodide was used instead of titanium tetrachloride. A polymer was obtained which had the same cis-content and nearly the same Mooney viscosity as that obtained according to Example 1, although the yield was smaller.

EXAMPLE 4

The process of Example 1 was repeated, with the difference that vanadium tetrachloride or vanadium oxychloride was used instead of titanium tetrachloride. A polymer was likewise formed, albeit with a smaller yield than in the case of Example 1.

EXAMPLE 18

3 litres of water-free heptane was introduced into a glass flask having a volume of 5 litres. 800 g. of butadiene were dissolevd in the heptane with cooling and stirring, after which 3 mmoles of titanium tetrachloride and 1 mmole of nickel tetracarbonyl were added. During the polymerization a stream of nitrogen was slowly passed over the polymerization liquid. The evaporating butadiene was condensed in a reflux cooler, which was kept at −20° C. After the polymerization had proceeded for 60 minutes, the addition of another 100 g. of butadiene was started, which addition was completed in 30 minutes. Periodically samples of the polymer solution was taken. The amounts of polybutadiene formed after the various polymerization times (calculated per mmole of nickel carbonyl added) are shown in the table. Of the unsaturated part of the polymer, 96% had the cis 1-4 structure, 2% the trans 1-4 structure, and 1% the 1-2 structure.

| | | | | Catalyst composition | | Polymerization | | | |
|---|---|---|---|---|---|---|---|---|---|
| Example | Conjugated diolefine | Amount of diolefine, g. | Distributing agent | Ni(CO)₄, mmoles | TiCl₄, mmoles | Time, min. | Temp., °C. | Polymer yield, g. | Polymer specification |
| 31 | Isoprene | 150 | Heptane | 2 | 10 | 180 | 20-30 | 25 | Rubbery polymer with high cis content. |
| 32 | Cyclopentadiene 1-3 | 75 | Benzene | 5 | 5 | 90 | 20-48 | 44 | Rubbery polymer; embittlement in air. |
| 33 | Dimethyl fulvene | 15 | Heptane | 2 | 1 | 120 | 20-27 | 6 | Powder liable to oxidation. |
| 34 | Isoprene and butadiene | 70 | Benzene | 2 | 2 | 30 | 20-34 | 11 | Rubbery polymer containing isoprene and butadiene. |

| Polymerization time, min.: | G. of polybutadiene per mmole of nickel tetracarbonyl |
|---|---|
| 60 | 21 |
| 105 | 103 |
| 155 | 237 |
| 195 | 275 |

EXAMPLES 19-23

Under similar conditions as stated in Example 1, butadiene was polymerized with a catalyst obtained by adding together 1 mmole of nickel tetracarbonyl and 2 mmoles of a mixture of titanium tetrachloride and titanium trichloride, in the ratios given in the table. The titanium trichloride was prepared in ordinary manner from titanium tetrachloride by reduction with hydrogen.

| Ex. | Ratio of titanium trichloride to titanium tetrachloride | Amount of polymer, g. | Time, min. | Cis-content, percent | Mooney viscosity |
|---|---|---|---|---|---|
| 19 | 0 | 25 | 90 | 93 | 53 |
| 20 | 1/3 | 36 | 78 | 93 | 60 |
| 21 | 1 | 44 | 90 | 93 | 35 |
| 22 | 3 | 30 | 90 | 93 | 26 |
| 23 | ∞ | 50 | 270 | 94 | |

EXAMPLES 24-29

Under otherwise similar conditions as mentioned in Example 1, varying amounts of water were added to the catalyst obtained by adding together 1 mmole of nickel carbonyl and 2 mmoles of titanium tetrachloride. An amount of water of up to about 65 moles percent with respect to the catalyst had a very favorable influence on the activity, as shown in the table below

| Example | Mmoles of water added | Amount of polymer, g. | Time, min. | Cis-content, percent | Mooney viscosity |
|---|---|---|---|---|---|
| 24 | 0 | 25 | 90 | 93 | 53 |
| 25 | 0.4 | 33 | 33 | 90 | 50 |
| 26 | 0.8 | 38 | 22 | 93 | 36 |
| 27 | 1.2 | 36 | 25 | 93 | 43 |
| 28 | 2.0 | 32 | 27 | 92 | 43 |
| 29 | 4.5 | 22 | 110 | 92 | 24 |

EXAMPLE 30

Under otherwise similar conditions as stated in Example 1 a small amount of air was supplied during the polymerization to the catalyst obtained by adding together 0.5 mmole of nickel tetracarbonyl and 0.5 mmole of titanium tetrachloride. In 60 minutes' time 23 g. of polymer were formed, which polymer was free of gel and had a cis-content of 94%. Its specific viscosity was 0.24, as measured on a solution of 0.1 g. of the polymer in 100 ml. of benzene at 20° C.

EXAMPLES 31-34

Instead of butadiene, other conjugated diolefines were used. All the diolefine was added to the polymerization medium at once. During the polymerization no gaseous diolefine escaped, for which reason the carbon monoxide released from the nickel carbonyl was expelled from the polymerization reactor by means of a slow stream of nitrogen. The conjugated diolefines used, and the other polymerization conditions, as well as the product properties, are shown in the table below.

EXAMPLE 35

In a flask containing 500 ml. of heptane, an active catalyst was formed from 10 mmoles of nickel tetracarbonyl and 10 mmoles of titanium tetrachloride in the presence of butadiene, with release and removal of carbon monoxide. Thereafter 1/20 part of the clear reaction medium was added to 500 ml. of heptane contained in an enclosed space, and butadiene was then added. 15 g. of polymer with a cis-content of 95% was formed over a period of time of 110 minutes.

What is claimed is:
1. A process for the preparation of high molecular weight polymer of conjugated dienes which comprises polymerizing said dienes in the presence of a catalyst produced from a metal carbonyl compound where the metal is selected from the group consisting of nickel and cobalt, and a metal halide, where the metal is selected from the group consisting of the 4th-6th groups of Mendeléef's Periodic System, and by releasing the carbon monoxide from the carbonyl compound in the presence of a compound selected from the group consisting of aliphatic and cyclo-aliphatic compounds with at least one olefinically unsaturated group, and compounds with at least one alkynically unsaturated group and substequently removing at least part of the carbon monoxide formed.

2. A process according to claim 1, wherein the formation of carbon monoxide takes place in the presence of at least one conjugated diene.

3. A process according to claim 2, wherein the resulting carbon monoxide is removed by evaporating part of said conjugated diene.

4. A process according to claim 1, wherein the release and removal of the carbon monoxide takes place in the presence of a halide of a metal of the 4th-6th groups of the Periodic System.

5. A process according to claim 1, wherein the release and removal of the carbon monoxide takes place in a single stage with the polymerization of the conjugated diene.

6. A process according to claim 1, wherein the conjugated diene used is butadiene.

7. A process according to claim 1, wherein the carbonyl compound is nickel tetracarbonyl.

8. A process according to claim 1, wherein the metal halide used contains a metal selected from the group consisting of metals of the 4th and 5th groups of the Periodic System.

9. A process according to claim 1, wherein the metal halide used is at least one titanium halide.

10. A process according to claim 7, wherein the metal halide used is at least one titanium halide.

11. A process according to claim 9, wherein the titanium halide is selected from the group consisting of titanium tetrachloride and a mixture of titanium tetrachloride and titanium trichloride.

12. A process according to claim 10, wherein the titanium halide is selected from the group consisting of titanium tetrachloride and a mixture of titanium tetrachloride and titanium trichloride.

13. Process according to claim 1, wherein the molar ratio between the carbonyl compound and the metal halide is between 35:1 and 1:35.

14. Process according to claim 1, wherein the molar ratio between the carbonyl compound and the metal halide is between 10:1 and 1:10.

15. A process according to claim 1, wherein the catalyst concentration is between 100 and 0.002 mmoles per litre of reaction medium.

16. A process according to claim 1, wherein a compound containing a free electron pair is added to the reaction medium.

17. A process according to claim 16, wherein the compound containing a free electron pair is selected from the group consisting of water and an oxygen containing gas.

18. A process according to claim 1, wherein the polymerization is carried out at a temperature between —50 and +150° C.

19. A process according to claim 1, wherein the polymerization is carried out in an inert distributing agent.

20. A process according to claim 1, wherein said conjugated diene is polymerized in an inert distributing agent at a temperature of between —50 and +150° C., in the presence of a catalyst produced from a nickel carbonyl compound and titanium halide.

21. A process according to claim 20, wherein the nickel carbonyl compound and titanium halide are used in a molar ratio of between 5:1 and 1:5.

22. A process according to claim 21, wherein the conjugated diene is butadiene and the nickel carbonyl compound is nickel tetracarbonyl.

23. A process according to claim 1, wherein the polymer obtained is vulcanized by means of sulphur.

24. A process according to claim 22, wherein the polymer obtained is vulcanized by means of sulphur.

References Cited
UNITED STATES PATENTS

| | | | |
|---|---|---|---|
| 3,016,371 | 1/1962 | Natta et al. | 260—94.3 |
| 3,357,957 | 12/1967 | Bromby et al. | 260—79.5 |

JOSEPH L. SCHOFER, Primary Examiner

R. A. GAITHER, Assistant Examiner

U.S. Cl. X.R.

260—79.5, 82.1, 85.3, 91.3, 93.1